Sept. 10, 1957      A. H. YORDI      2,805,778

AUTOMOBILE TOOL TRAY

Filed March 17, 1954

Arthur H. Yordi
INVENTOR

BY *Arthur M. Streich*

ATTORNEY

2,805,778

AUTOMOBILE TOOL TRAY

Arthur H. Yordi, Kenosha, Wis.

Application March 17, 1954, Serial No. 416,738

1 Claim. (Cl. 211—86)

This invention relates to an automobile tool tray particularly adapted to be attached to an automobile in such a position that the tray is readily accessible to a mechanic working on the automobile engine.

It is an object of this invention to provide a tool tray adapted to be easily, releasably attached to any automobile and disposed to be accessible for mechanics working on or around the engine.

Another object of this invention is to adapt a tray to be firmly attached to any automobile utilizing as part of the tool tray attachment means, standard parts of the automobile.

Still another object of this invention is to provide a tool tray for attachment to any automobile, the tray being easily disposed in any of various angular positions relative to said automobile so as to be horizontally disposed when said automobile is parked on an inclined surface and said tray being firmly held by cooperative engagement with standard elements of the automobile.

And still another object of this invention is to provide a tool tray having rugged attaching means coacting with fastening parts attached to an automobile and so adapted that the tray is easily and quickly releasably attached to the automobile to be firmly positioned and securely held thereto.

These and other objects and advantages of this invention will be understood from consideration of the following description taken in conjunction with the accompanying drawing, in which.

Figure 1:
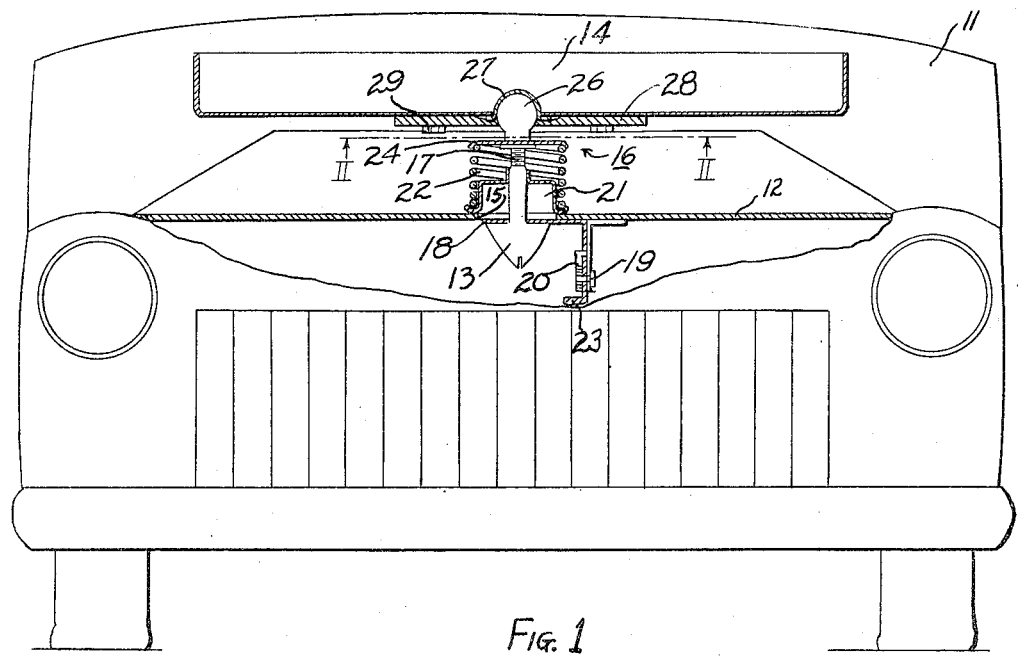
Fig. 1 is a front view of part of an automobile with the hood removed showing a mechanic's tool tray made and attached to the automobile in accordance with this invention. The tray and cooperating fastening parts of the automobile are shown in section.
Figure 2:
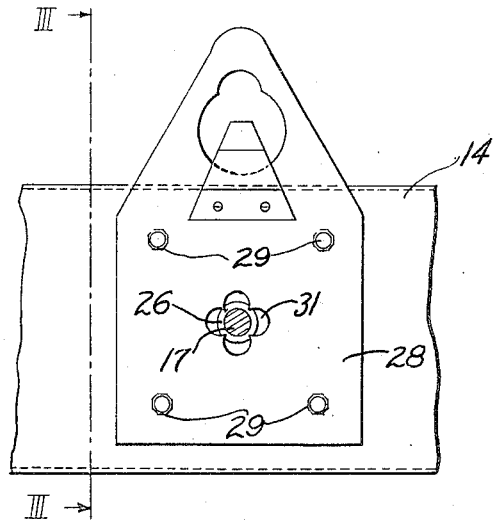
Fig. 2 is a plan view of part of the tool tray shown in Fig. 1.
Figure 3:
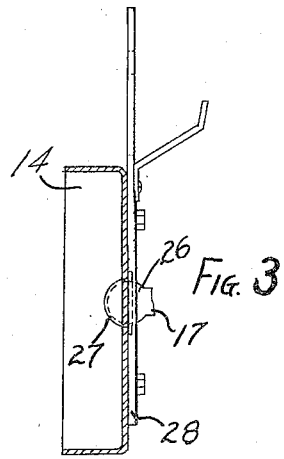
Fig. 3 is a sectional view taken along line III—III of Fig. 2.

In the drawing, reference numeral 11 represents an automobile with numeral 12 representing a tie plate hood element between the grille, radiator and fenders, or what is sometimes also called a radiator baffle.

A tool tray element 14 made of any suitable material such as metal, is adapted to be removably disposed between the grille and radiator, being elevated as desired above the tie plate 12. The invention includes clamping means 16 which may be connected to tray 14 as shown in the drawing, for engaging with a lower hood latch means contained in the tie plate 12, thus being conveniently disposed in a very satisfactory position near the radiator so as to be easily reached by a mechanic working on the engine. The tool tray attaching means provided for coacting with hood latch means attached to tie plate 12 is ruggedly built too firmly hold a load of tools with the tray in a fixed position.

Clamping means 16, part of which is similar to the hood locking means on the removed hood, may be connected to the tray 14 and this clamping means also includes means to provide for tilting the tray whereby the tray bottom may be horizontal regardless of the incline of the automobile and its tie plate element 12.

Clamping means 16 include a post 17 connected at one end to the bottom of tray element 14 and post 17 extends outwardly from the bottom of tray element 14 for any length desired as determined by the preferred elevation of the tray over the tie plate 12. The other end of the post 17 has an enlarged head portion 13 adapted to be firmly held to the lower hood tie plate element 12. Latch means provided to engage and hold post 17 include socket means which may be simply, as shown, an opening 15 in tie plate 12. Opening 15 is slightly larger than head portion 13 of post 17 so that the head portion may be projected through the opening. A catch piece 18 is pivotally connected at 19 to the tie plate element to releasably engage post 17 behind the enlarged head of the post which projects through the opening in the tie plate 12. Catch piece 18 is biased in any well known manner as by spring 20 to snap into locking position as the post head is pushed through the opening in the tie plate. The catch is conventionally moved from that position to release the tray, by hand operated lever 23, thus being part of the latch means.

Tray 14 is firmly clamped to the tie plate latch means by a collar 21 biased by a spring 22 toward the enlarged head portion 13 of post 17. Collar 21 is larger than opening 15 in order to compress spring 22 when the post head is pushed through opening 15.

Spring 22 which biases the retaining collar 21 toward head portion 13, is disposed around post 17 and confined between a flange 24 that is fixedly attached to the post 17 at the end opposite head portion 13 and an outwardly extending flange of collar 21. Spring 22 thereby urges collar 21 toward head portion 13 and releasably clamps catch piece 18 between collar 21 and head portion 13 to attach tray element 14 to tie plate hood element 12.

For tilting the tray element 14 relative to tie plate hood element 12 to dispose the bottom of the tray horizontally, means connecting the post 17 to the tray comprises a ball and socket joint. A ball 26 is formed at the end of post 17 and socket 27, which is slightly more than hemispherical, is carried in the tray bottom. This socket extends through the tray bottom having an outwardly flanged lip that abuts the lower surface of the tray bottom. The center of ball 26 is disposed above the lower tray surface and is held by a retaining cover 28 applied to the tray bottom as by bolts 29. This retaining cover has a hole through it smaller than the diameter of ball 26 but larger than the diameter of the intermediate shaft of the post 17. This cover 28 constitutes retaining means holding the ball in the socket with the post shaft extending through the hole in the cover. In order to firmly hold the post 17 at any selected angle to the tray 14, a hole 31 is suitably cut in cover 28 to define four spaced points, at least three of which tightly engage the lower surface of ball 26 clamping that ball in any selected position. Movement of the ball is effected only when force is exerted to deliberately move the disposition of the bottom of the tray by moving the ball to vary the outwardly extending angle at which the post is disposed.

While operation or use of the tool tray is considered obvious from the description of the tray and attaching means, briefly stated it is used as follows.

The tray 14 is held parallel to tie plate 12 with the post 17 extending downwardly. The post 17 is pushed through the latch means opening 15 in the tie plate, and as this is done retaining collar 21 abuts the tie plate around the opening. The collar is slidably mounted on the post, and spring 22 is thus compressed as the post head 13 projects through the opening 15, pushing catch piece 18 against the bias of its spring 20. As soon as the post head 13 passes the catch piece 18 by being pushed through the tie plate, the catch piece is snapped by its bias spring behind the post head. The tray is then firmly attached to the tie plate until catch 18 is moved from behind the post head, whereby the tray may be easily lifted from the tie plate.

While various changes may be made in the detail construction including reversal of parts without changing the nature of the operation of such parts, it shall be understood that such changes shall be within the spirit and scope of the present invention as defined by the appended claim.

It is claimed and desired to secure as Letters Patent:

In combination, an automobile having a grille and radiator with a tie plate hood element therebetween, a tool tray element and means for attaching said tray element to said tie plate hood element, said means comprising clamping means connected to said tray element and latch means connected to said tie plate hood element, said clamping means including a post connected on one end to said tray by a ball and socket connection and the other end of said post having an enlarged head portion, a coil spring disposed around said post between said ball and socket connection and said head portion, and an annular collar disposed around said post between said spring and said head portion, said spring being biased to urge said collar against said head portion; said latch means including socket means and a catch piece, said socket piece being larger than said head portion but smaller than said collar, said head portion being insertable into said socket means with said collar engaging said socket means to compress said spring upon insertion of said head portion into said socket means, and said catch piece being engageable with said clamping means between said collar and said head portion whereby the bias of said spring releasably clamps said catch piece between said collar and said head portion to attach said tray element to said tie plate hood element.

References Cited in the file of this patent

UNITED STATES PATENTS

| | | |
|---|---|---|
| 1,155,043 | Cilley | Sept. 28, 1915 |
| 1,276,666 | Lohmann | Aug. 20, 1918 |
| 1,723,238 | Hoot | Aug. 6, 1929 |
| 2,187,426 | Kuhnel | Jan. 16, 1940 |
| 2,195,366 | Haigh | Mar. 26, 1940 |
| 2,243,758 | Krause | May 27, 1941 |
| 2,286,739 | Krause | June 16, 1942 |
| 2,420,060 | Adams | May 6, 1947 |
| 2,420,061 | Adams | May 6, 1947 |
| 2,510,436 | Trammell | June 6, 1950 |